United States Patent [19]

Dor

[11] Patent Number: 5,471,678
[45] Date of Patent: Dec. 5, 1995

[54] FLIP-UP MOUNT FOR NIGHT VISION SYSTEM

[75] Inventor: Amotz Dor, Haifa, Israel

[73] Assignee: Litton Systems, Inc., Beverly Hills, Calif.

[21] Appl. No.: 299,430

[22] Filed: Sep. 1, 1994

Related U.S. Application Data

[63] Continuation of Ser. No. 912,875, Jul. 13, 1992.
[51] Int. Cl.$^6$ ................................ A42B 3/02; A42B 1/24
[52] U.S. Cl. ........................................... 2/6.7; 2/422
[58] Field of Search .................................. 2/6, 422, 410, 2/421, 6.3, 6.7; 359/409, 815, 407

[56] References Cited

U.S. PATENT DOCUMENTS

| | | | |
|---|---|---|---|
| 4,689,834 | 9/1987 | McCarthy | 2/422 |
| 4,703,879 | 11/1987 | Kastendieck et al. | 2/6 X |
| 4,893,356 | 1/1990 | Waters | 2/422 X |
| 4,987,608 | 1/1991 | Cobb | 2/422 X |
| 5,077,839 | 1/1992 | Keller | 2/421 |

OTHER PUBLICATIONS

Eyes In The Dark–Night Vision In A New Light, by Greg Walker, dated Jul., 1989, pp. 54–56.

Night–Vision Goggles, by Mark Hewish, in the Defense Electronics & Computing, dated Feb. 1992, pp. 17–24.

We Own The Night, by Doug Richardson, Armade International, dated Oct./Nov. 1991, pp. 44–50.

*Primary Examiner*—Peter Nerbun
*Attorney, Agent, or Firm*—Poms, Smith, Lande & Rose

[57] ABSTRACT

A flip-up mount is provided for a night vision system. The mount comprises a carriage which is configured to engage a coupling device provided on the night vision system and secure the system in place. A pivotal armature is attached to the carriage and extends from a pivot point. The armature pivots between a first operational position enabling an operator to use the system, and a second stowed position. An anchor secures the pivot point to a helmet worn by the operator of the system. The pivot point further comprises a brace having an axle shaft, a sleeve integral to the armature and rotatable about the shaft, and a spring biased locking member securing the sleeve in a selected one of the first and the second positions. A supplemental chin strap is provided to prevent unwanted movement of the helmet when the night vision system is in the stowed position. Alternatively, the flip-up mount can be used in conjunction with a face mask worn by the operator. The night vision system can be either a binocular or monocular device.

18 Claims, 5 Drawing Sheets

FLIP-UP MOUNT FOR NIGHT VISION SYSTEM

This is a continuation of copending application Ser. No. 07/912,875 filed on Jul. 13, 1992.

BACKGROUND OF THE INVENTION

1. Related Applications

The present invention relates to and incorporates by reference the teachings of the following co-pending patent applications: (1) Improved Night Vision System and Mounting Assembly, Ser. No. 07/805,187, filed Dec. 10, 1991, by Dor; and (2) Universal Adapter For Night Vision System, Ser. No. 07/912,835, filed Jul. 13, 1992, by Dor.

2. Field of the Invention

The present invention relates to a night vision system, and more particularly, to a flip-up mount for use with a face mask or helmet which enables the night vision system to be pivoted between an operational and a non-operational position.

3. Description of Related Art

Night vision systems are commonly used by military and law enforcement personnel for conducting operations in low light or night conditions. These systems intensify the ambient light to produce an output image which is visible to the human eye. Such night vision systems either take the form of binoculars, having separate eye pieces for each eye, or monoculars, having only a single eye piece.

It is common for operators of night vision systems to desire hands-free operation in which the binocular or monocular systems can be mounted to either a face mask worn on the operator's face, or to the operator's helmet. The typical face mask mounting assembly comprises a rod which is held to the operator's face by use of a strap which wraps around the head and connects to the rod at two or more places. At the center of the forehead portion of the rod, a mount is provided which would engage the binocular or monocular system. Helmet mounting assemblies are also available, in which the rod mounts directly to the operator's helmet. A helmet mounting assembly of this kind is disclosed in the co-pending application described above. The components comprising a face mask or helmet mounting system are referred to collectively as headgear.

It frequently becomes necessary for the operator of a night vision system to temporarily remove the system from its operational position. For example, an operator of a vehicle such as a truck or a helicopter traveling during low light conditions would typically use a face mask or helmet mounted night vision system. However, if it becomes necessary to quickly glance at items within the vehicle, such as a map or an instrument gauge, the operator would need to either dislodge the night vision system from within its locked position, or peek around the edges of the eye piece of the system. Although installation and removal of the night vision system from its carriage on the headgear is a relatively simple task, it does require a certain degree of skill and can be hampered by the stress of the operational environment.

Thus, it would be desirable to provide a mount for a night vision system which enables the system to be easily pivoted from an operational to a non-operational position, without requiring removal of the system. It would be further desirable to provide a mount for a night vision system that adapts with the face mask mounting assembly and helmet mounting assembly that are already commercially available.

SUMMARY OF THE INVENTION

Accordingly, a principal object of the present invention is to provide a flip-up mount for a night vision system which enables an operator to manipulate the system between an operational position and a non-operational position.

Another object of the present invention is to provide a flip-up mount for a night vision system which is compatible with existing face mask mounts and helmet mounts.

To achieve the foregoing objects and in accordance with the purpose of the invention, a flip-up mount for a night vision system is provided. The mount comprises a carriage which is configured to engage a coupling device provided on the night vision system and secure the system in place. A pivotal armature is attached to the carriage and extends from a pivot point. The armature pivots between a first operational position enabling an operator to use the system and a second stowed position. An anchor secures the pivot point to a helmet worn by the operator of the system. The pivot point further comprises a brace having an axle shaft, a sleeve integral to the armature and rotatable about the shaft, and a spring biased locking member securing the sleeve in a selected one of the first and second positions.

The anchor which secures the pivot point to the helmet further comprises a horizontal support rod and a pair of carriage support rods which extend perpendicularly from the horizontal support rod. The carriage support rods connect to a brace which carries the pivot point. A forward hook secured to the carriage support rods engages a forward edge of the helmet. A strap secured to the horizontal support rod secures to a rearward edge of the helmet. A rachet mechanism is further provided to vary the length of the strap, enabling use of the flip-up mount with either a large, medium, or small helmet.

In an alternative embodiment of the present invention, a flip-up mount for a night vision system is provided for use with a face mask mount. The flip-up mount comprises a carriage configured to engage a coupling device provided on the night vision system and secure the system thereto. A pivotal armature is integrally formed to the carriage and extends to the pivot point. The armature pivots between a first operational position enabling the operator to use the system in a second stowed position. A brace carries the pivot point, and has an axle shaft, a sleeve integral to the armature and rotatable about the shaft, and a spring biased locking member securing the sleeve in a selected one of a first and second position. The brace secures to a face mask worn by the operator of the night vision system A more complete understanding of the flip-up mount for a night vision system of the present invention will be afforded to those skilled in the art, as well as a realization of additional advantages and objects thereof, by a consideration of the following Detailed Description of the Preferred Embodiment. Reference will be made to the appended sheets of drawing which will first be described briefly.

BRIEF DESCRIPTION OF THE DRAWINGS

FIG. 8 is a side view of the flip-up mount secured to a helmet, showing the chin strap assembly.

DETAILED DESCRIPTION OF THE PREFERRED EMBODIMENT

Figure 1:
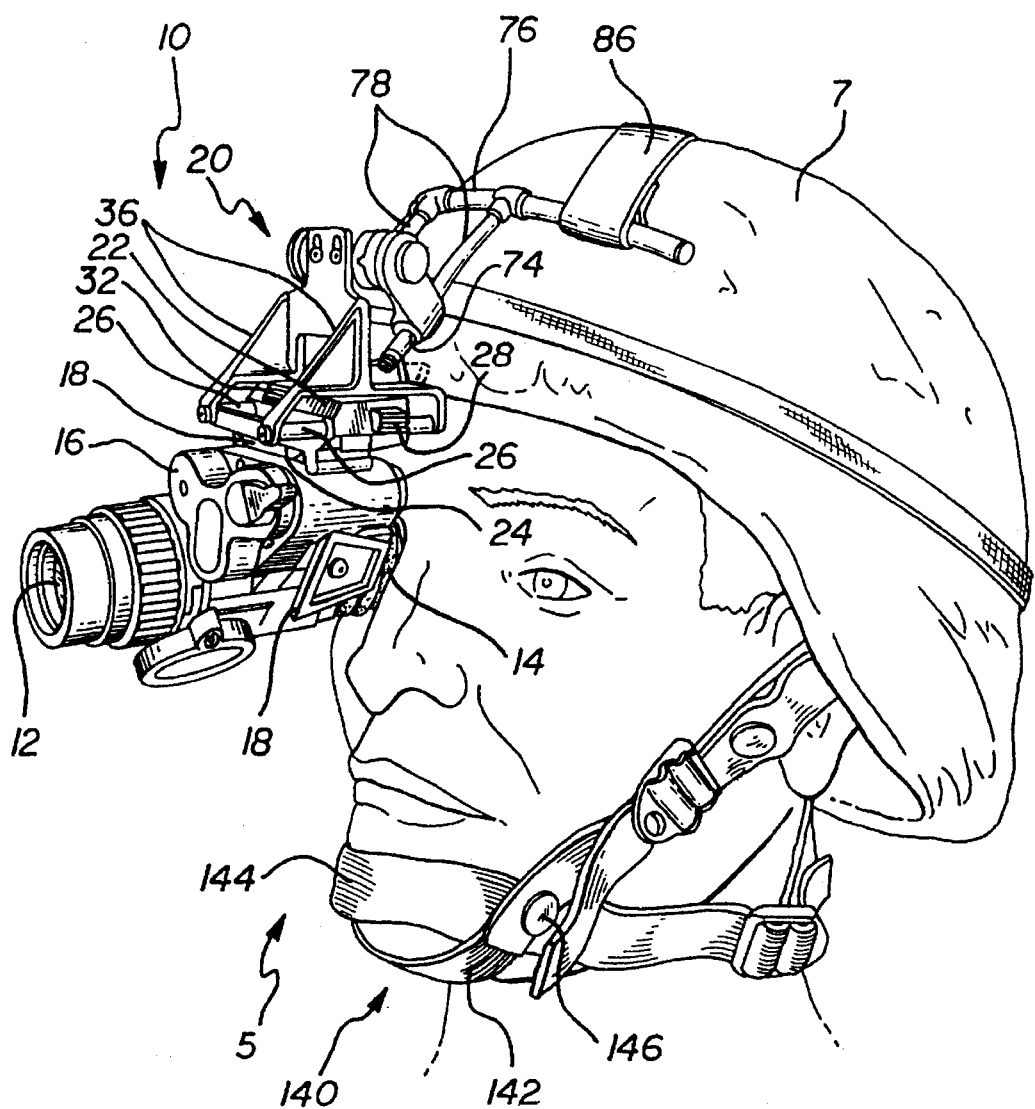
FIG. 1 shows a perspective view of the flip-up mount secured to a helmet worn by an operator, used in conjunction with a monocular type night vision system.
Figure 2:
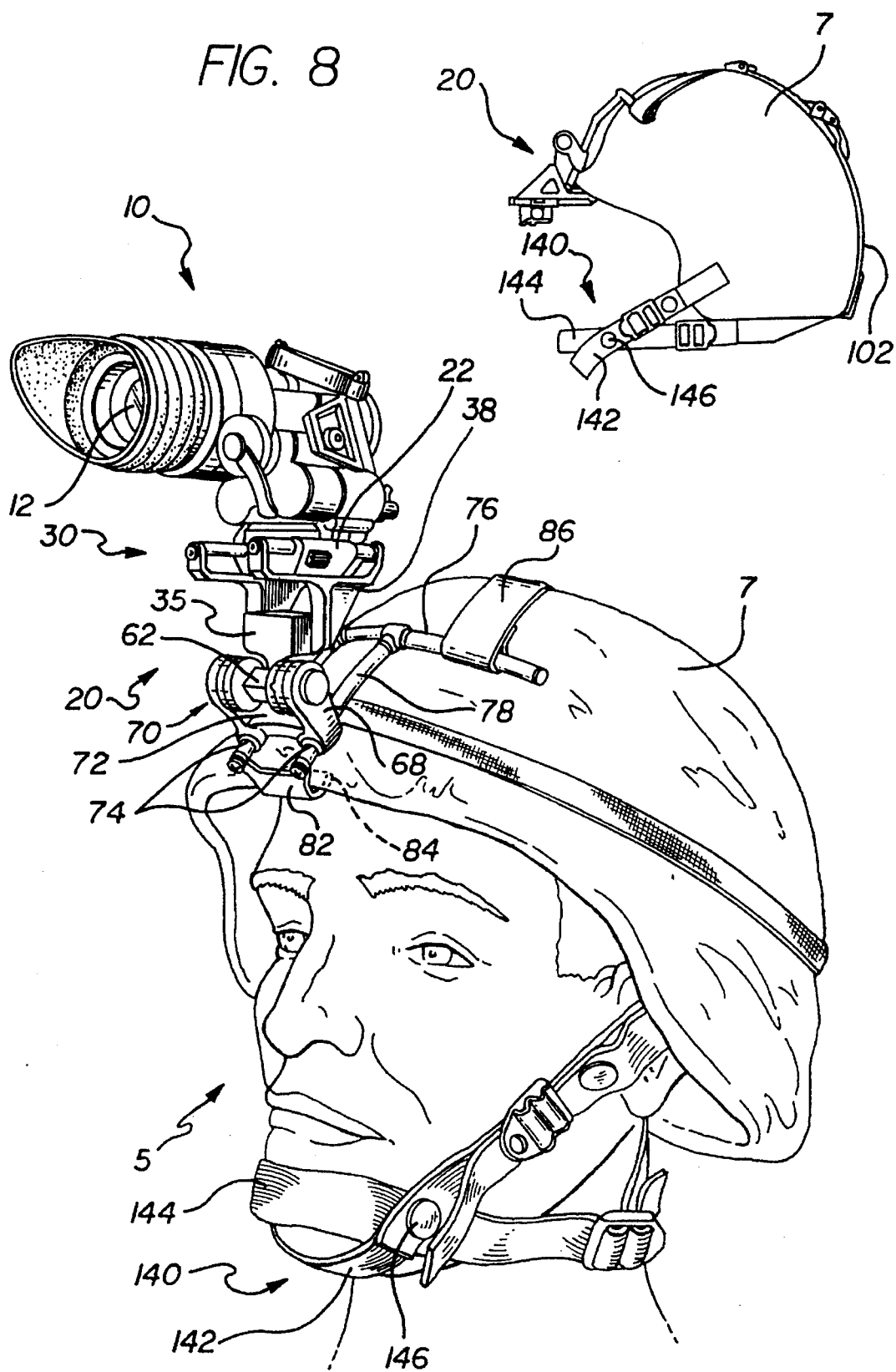
FIG. 2 is a perspective view as in FIG. 1, showing the night vision monocular pivoted upward to the non-operational position.

Referring first to FIGS. 1 and 2, there is shown an operator 5 using a night vision monocular 10. The monocular 10 is secured to a helmet 7 by use of a flip-up mount 20, which will be further described below. The monocular 10 has an objective lens 12, an eye piece 14 and a housing 16 between the objective lens and the eye piece. To use the monocular 10, the operator 5 looks through the eye piece 14 and sees an enhanced image representative of the light which enters the objective lens 12. Although a night vision monocular 10 is shown, binocular systems are also widely used.

The night vision monocular 10 secures to the flip-up mount 20 by interaction between a carriage 22 and a coupling device 18. The coupling device 18 comprises a trapezoidal plate which is secured to the housing 16 of the monocular 10. The plate 18 engages a plate receiving portion 24 of the carriage 22. Once within the plate receiving portion 24, an internal locking mechanism (not shown) secures the plate 18 in position. To remove the night vision monocular 10 and associated plate 18 from connection with the carriage 22, an eject button 32 is provided. By manually depressing the eject button 32, the internal locking mechanism withdraws, allowing the plate 18 to be removed from engagement with the carriage 22.

The position of the carriage 22 relative to the operator 5 is adjustable along rails 26. The rails 26 enable the night vision monocular 10 to be precisely positioned relative to the operator's eye, so as to optimize the system for each particular operator. Adjustment buttons 28 are provided which release the carriage from a normally secured position relative the rails 26 to enable the carriage 22 to be repositioned. Once a desired position has been obtained, the operator releases the adjustment buttons 28 and the carriage 22 locks into place.

The flip-up mount 20 enables the operator 5 to manipulate the night vision monocular 10 between the operational position shown in FIG. 1, and the non-operational shown in FIG. 2. In FIG. 1, the monocular 10 is positioned relative the operator's eye so that the operator can normally view through the monocular. In FIG. 2, the monocular 10 has been raised to the non-operational position so that both of the operator's eyes are unobstructed. The night vision monocular 10 will remain temporarily secured in the non-operational position until the operator chooses to return the monocular to the operational position.

Figure 3:
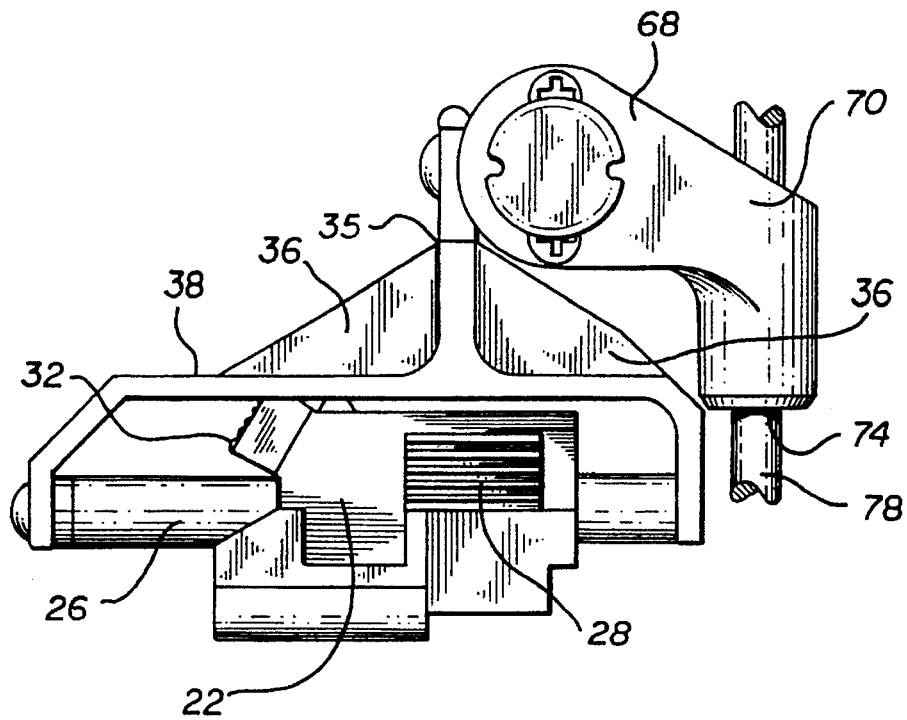
FIG. 3 is a side view of the flip-up mount of the present invention.
Figure 4:
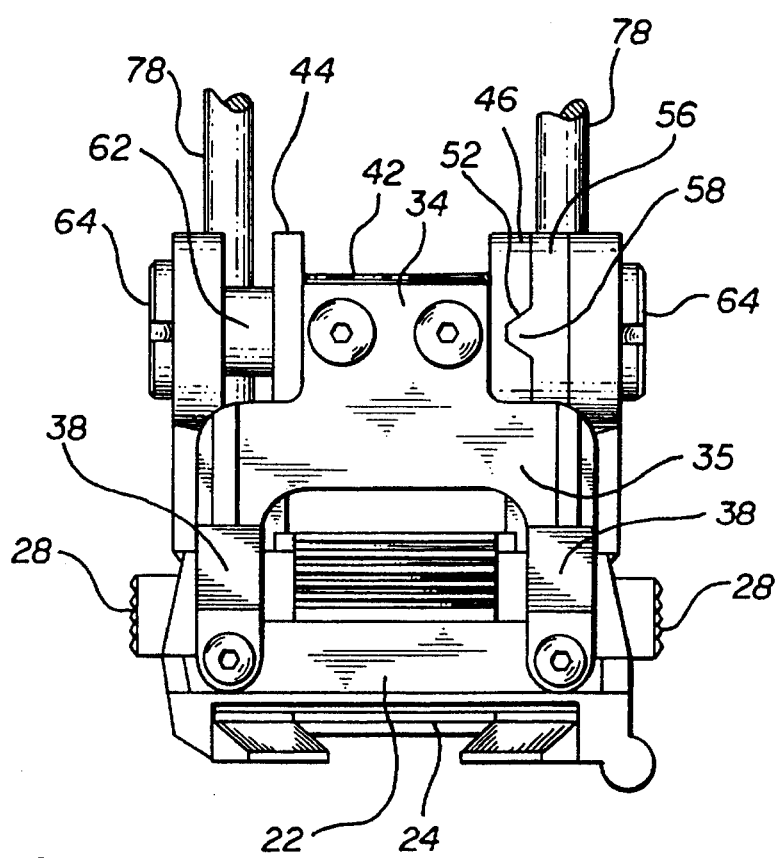
FIG. 4 is the front view of the flip-up mount.
Figure 5:
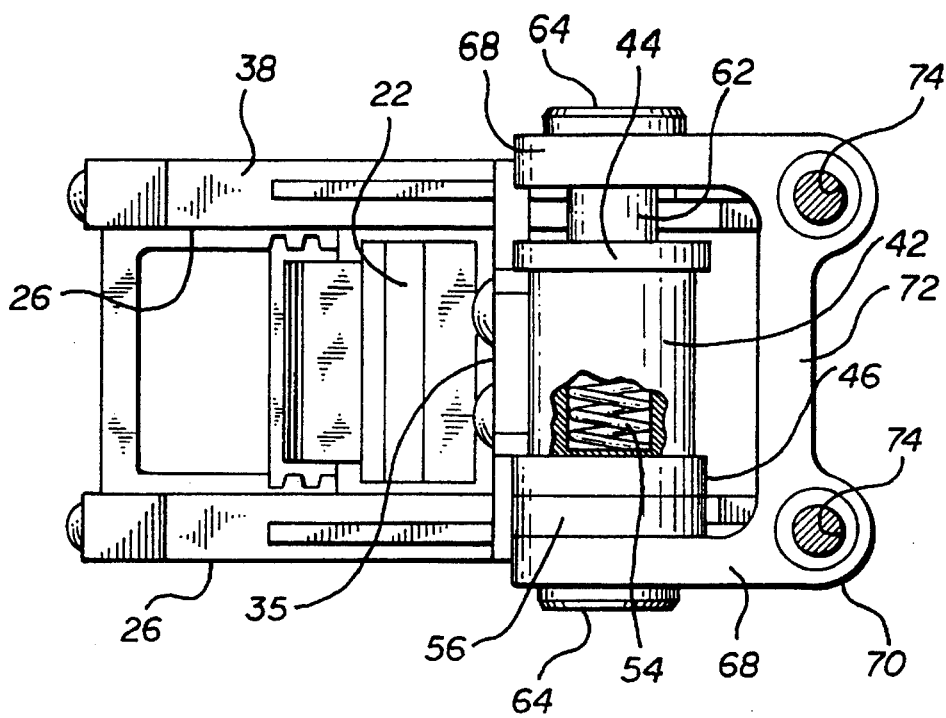
FIG. 5 is a partial cut-away top view of the flip-up mount.

The flip-up mount 20 is shown in greater detail in FIGS. 3, 4 and 5. The flip-up mount 20 comprises an armature portion 30 which carries the carriage 22, and a support brace portion 70. The support brace 70 has a pivot axis about from which the armature 30 pivots, as will be further described below. The support brace portion 70 secures to the helmet 7 or a face mask 120, which will also be described below.

The armature portion 30 comprises a back wall 35 and a carriage frame 38. The back wall 35 tapers to a top portion 34 which secures to the pivot axis, which will be described below. The carriage frame 38 secures to either end of each of the adjustment rails 26, providing a rigid support structure for the carriage 22. The carriage frame 38 extends generally perpendicular to the back wall 35. A support web 36 fills the generally triangular area formed by the intersection of the back wall 35 and the carriage frame 38, providing additional structural strength to the armature 30.

The support brace portion 70 has a pair of outwardly extending support arms 68 which hold a shaft 62. The shaft 62 provides the pivot axis for the armature portion 30. The shaft 62 secures to the support brace 70 by end caps 64 disposed on either end of the shaft. A facing washer 56 is disposed around the shaft 62 at an end of the shaft adjacent to one of the support arms 68. The facing washer 56 has a finger 58 having tapered side surfaces. The top portion 34 of the back wall 35 secures to a pivot sleeve 42 disposed around the shaft 62. An end washer 44 forms one end of the pivot sleeve 42. The other end of the pivot sleeve 42 is formed by a notched washer 46. The notched washer 46 has a pair of notches 52, each of which is formed to receive the finger 58 described above. The notches 52 are disposed 180° apart relative the notched washer 46. As shown in FIG. 5, a compression spring 54 is provided within the pivot sleeve 42. One end of the compression spring 54 presses against the end washer 46, to yieldably urge this washer 46 and sleeve 42 toward the facing washer 56. Thus, the compression force of the spring 54 maintains the pivot sleeve 42 generally pressed axially against the facing washer 56 with the finger 58 extending into the notch 52, effectively locking the armature 30 in place.

To manipulate the armature 30 between the first and the second positions, the armature is moved so that the finger 58 leaves the first notch 52 against the normal bias of the spring 54. It will be apparent that because of the tapered side surfaces of the finger 58, the sleeve 42 moves axially to the left viewing FIG. 4, or axially upwardly viewing FIG. 5 (which is toward the right hand side of the operator 5), along the shaft 62 in order to allow the sleeve 42 and armature 30 (along with night vision monocular 10) to pivot from the operative position as shown. The operator continues to rotate the armature 30 relative the support brace until the finger 58 reaches the second notch 52, sleeve 42 is moved back toward the facing washer 56 by spring 54, and the finger 58 snaps into the second notch 52. In so doing, the operator can easily manipulate the armature between the two positions, and the armature will remain in the selected position by interaction between the finger 58 and the selected notch 52.

As shown in FIGS. 1 and 2, the support brace 70 has a pair of spaced apart bore holes 74 that are generally joined by a bridge portion 72. Each of the bore holes 74 are intended to receive one of a pair of vertical anchor rods 78 which secure to the helmet 7. The vertical anchor rods extend along the surface of the helmet and are joined to a horizontal anchor rod 76. The lower end of the vertical anchor rod 78 holds a forward helmet hook 82 which has a curved lip portion 84. The lip portion 84 engages around the visor 9 of the helmet. The horizontal anchor rod 76 receives a pair of top straps 86 to rigidly hold the rod 76 and 78 in place.

Figure 6:
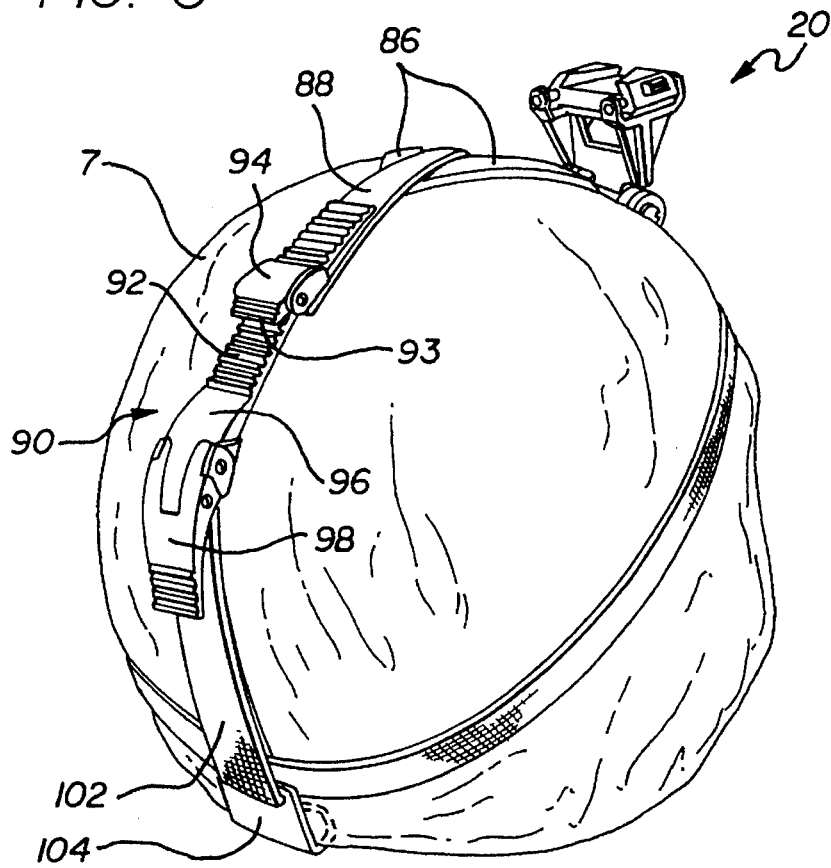
FIG. 6 is a perspective view of the flip-up mount secured to a helmet, showing a ratchet adjustment mechanism.

As shown in FIG. 6, the top straps 86 join to a center strap 88 which has a ratchet mechanism, shown generally at 90. The ratchet mechanism 90 has a corrugated portion 92 having a plurality of ridges. The ridges interact with a size adjuster 94 to vary the length of the center strap 88. By pressing on the tab portion 93 of the adjustor 94, the adjustor comes out of engagement with the corrugated portion 92, allowing the corrugated portion to be either tightened or loosened, as desired. A ratchet release 96 is also provided to clamp the strap onto the helmet 7. Extending from the corrugated portion, is a rear strap 102, which terminates with a rear hook 104. The rear hook 104 engages the back edge of the helmet 7. By clamping the ratchet release 96 downward, the entire center strap 88 holds tightly across the outer surface of the helmet 7, holding the flip-up mount 20 rigidly in place. To release the helmet strap if removal from the helmet or adjustment of the helmet mount is desired, the operator lifts up on the handle portion 98 of the ratchet release, causing the entire strap to loosen.

To maintain the helmet 7 in the proper position relative the operator's head, a supplemental chin strap is provided. The standard issue helmet used by United States forces employs a chin strap which secures to the helmet at two places. The standard chin strap secures to two points adjacent the operator's ear on the helmet 7 and wraps under the operator's chin to the opposite side of the helmet. When the night vision monocular 10 has been manipulated to the operational position, the additional weight of the system may cause the helmet 7 to drop forward relative the operator's face. This tends to set the system out of alignment with the operator's eye, and further causes the helmet to be uncomfortable to the operator. To remedy this problem, a supplemental chin strap 140 is incorporated into the present invention. The supplemental chin strap 140 completely replaces the standard chin strap which is provided with the helmet 7 with a first chin strap 144 and a second chin strap 142. The first chin strap 144 comprises a continuation of the rear strap 102, wrapping around the operator's neck and finally securing at the rear hook 104. The second chin strap 142 crosses and connects to the first chin strap 144 at a button 146. This 3-point supplemental chin strap maintains the helmet 7 in the proper position when the night vision system 10 is moved to the operational position.

Figure 7:
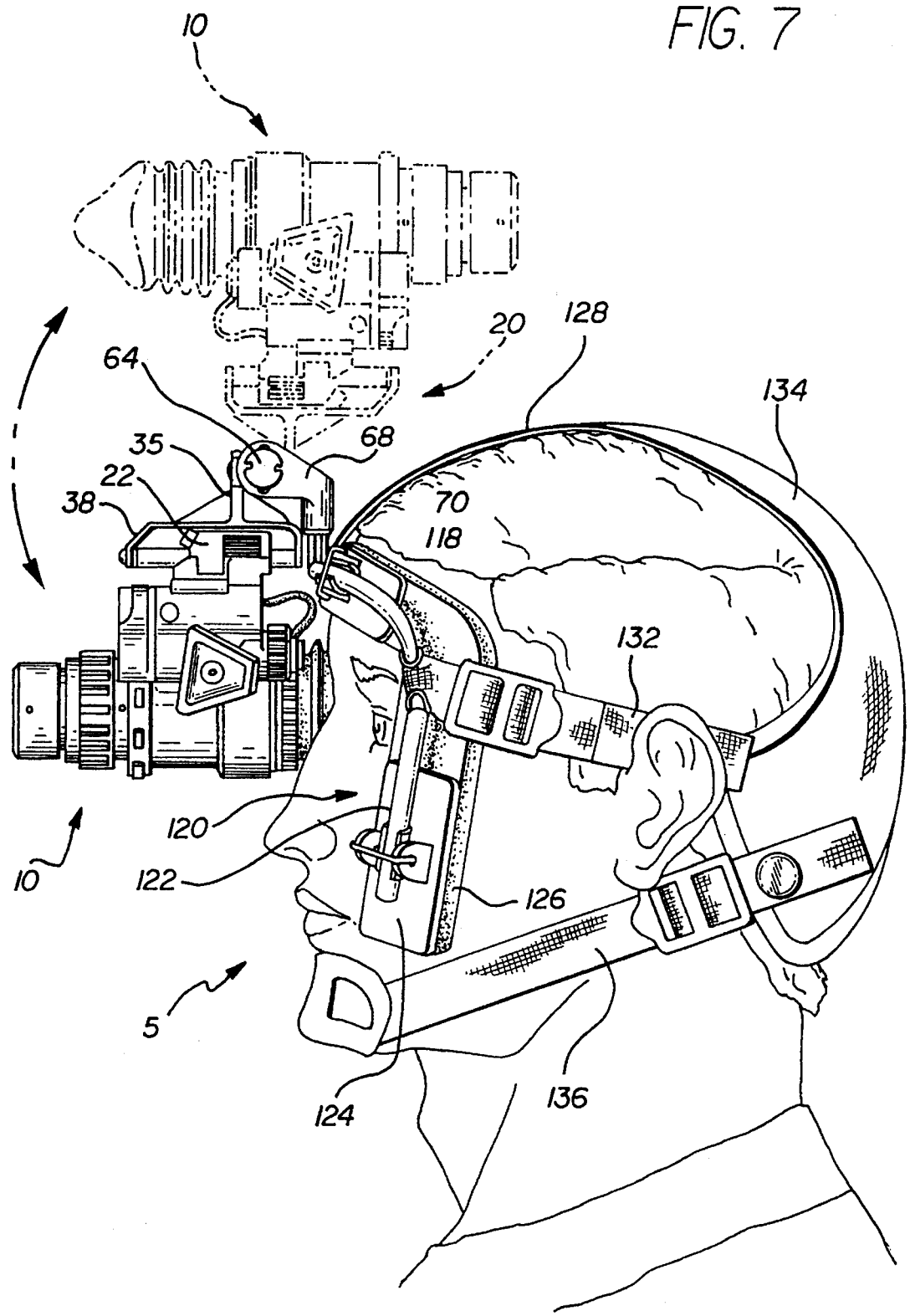
FIG. 7 is a side view of the flip-up mount secured to a face mask, used in conjunction with a night vision monocular.

Referring now to FIG. 7, there is shown a monocular 10 used in conjunction with a flip-up mount 20 secured to a face mask 120. The face mask 120 comprises a curved rod 122 which partially surrounds the operator's face. The curved rod 122 has a plurality of cushion plates 124 evenly spaced around the operator's face. A sponge rubber pad 126 secures to the cushion plates so as to provide a comfortable fit for the operator. A top strap 128 extends from a center portion of the rod 122, which goes over the top of the operator's head and attaches to a skull cap 134 which engages the back of the operator's head. Side straps 132 similarly combine the rod 122 with the skull cap 134. Finally, a chin strap 136 extends from the back of the skull cap 134 to attach around the operator's chin.

Extending upward from a center portion of the rod 122 are a pair of spaced apart extension rods 118. The extension rods are spaced similar to the vertical anchor rod 78 described above. The extension bars 118 extend through the bore holes 74 of the support brace 70, securing the support brace to the face mask 120. It should be apparent that operation of the flip-up mount 20 in conjunction with the face mask 120 would be substantially identical to that described above when used in conjunction with the helmet mount.

It is anticipated that the flip-up mount 20 be used in conjunction with a variety of types of night vision systems. Both night vision binoculars and monoculars are anticipated, as well as systems utilizing plate type mounting connectors or plug type mounting connectors. FIGS. 1–7 show the use of the flip-up mount in conjunction with a plate type connector. FIG. 8 shows the flip-up mount 20 used in conjunction with a helmet 7 and a plug type connector. It is further anticipated that the adapter disclosed in the above identified co-pending patent application be used in conjunction with the face mask of FIG. 7 to enable the AN/PVS-7B night vision goggle.

Having thus described a preferred embodiment of a flip-up mount for a night vision system, it should now be apparent to those skilled in the art that the aforestated objects and advantages for the within system have been achieved. It should also be appreciated by those skilled in the art that various modifications, adaptations, and alternative embodiments thereof may be made within the scope and spirit of the present invention, which is further defined by the following claims.

What is claimed is:

1. A flip-up mount for supporting a night vision system from a headgear worn by an operator, said flip-up mount comprising:

a carriage configured to engage a coupling device provided on said night vision system and secure said system thereto;

a pivotal armature carrying said carriage and extending from a pivot axis, said armature pivoting between a first operational position enabling the operator to use the system, and a second stowed position;

a brace having a shaft defining said pivot axis and carrying a locking member, a sleeve carrying said armature which is rotatable about and movable axially along said shaft, and a spring biasing said sleeve toward axial engagement with said locking member and securing said sleeve in a selected one of said first and second positions, said brace including means for securing to the head gear worn by the operator of the night vision system.

2. The flip-up mount of claim 1 wherein said locking member further comprises:

a finger extending axially of said shaft adjacent to an end thereof, said finger having generally bevelled edges;

said sleeve having an integral facing surface and a pair of notches extending into said facing surface, and said sleeve being normally biased into direct contact with said finger at said facing surface by use of said spring, said notches being disposed angularly apart;

wherein, said sleeve can be rotated and displaced axially relative said shaft until said finger engages a selected one of said notches securing said armature in place relative to said pivot point.

3. The flip-up mount of claim 2 wherein said headgear comprises a face mask worn by the operator.

4. The flip-up mount of claim 2, wherein said headgear comprises a helmet worn by said operator.

5. The flip-up mount of claim 2 wherein said headgear comprises a face mask worn by said operator.

6. A flip-up mount for supporting a night vision system from a helmet worn by an operator, said flip up mount comprising:

a carriage configured to slidably receive into engagement and to supportingly couple with a coupling device provided on the night vision system, and to thereby support and secure the system thereto;

a pivotal armature carrying said carriage and extending from a pivot axis defined by a shaft, said armature pivoting between a first operational position enabling an operator to use the system, and a second stowed position; and an anchor including means for securing said shaft which defines said pivot axis to the helmet worn by the operator of the system;

wherein said pivot axis is further defined cooperatively by a brace having a shaft, a sleeve integral to said armature and rotatable about said shaft, and a spring biased locking device securing said sleeve in a selected one of said first and second positions.

7. The flip-up mount of claim 6, wherein said locking device further comprises:

a finger extending axially from one of said brace and sleeve, said finger having generally beveled edges;

the other of said brace and sleeve having an axially disposed facing surface and a pair of notches extending into said facing surface, a spring biasing said finger normally into direct contact with said facing surface, said notches being disposed angularly apart;

wherein, said sleeve can be rotated relative said shaft until said finger engages a selected one of said notches securing said armature in place relative to said pivot axis.

8. The flip-up mount of claim 6, wherein said anchor further comprises:

a horizontal support rod and a pair of carriage support rods which extend perpendicularly from said horizontal support rod, said carriage support rods connecting to said brace;

a forward hook secured to said carriage support rods and hooking a forward edge of said helmet;

a strap secured to said horizontal support rod and securing to a rearward edge of said helmet.

9. The flip-up mount of claim 8, further comprising a ratchet means for varying the length of said strap.

10. The flip-up mount of claim 9, further comprising a supplemental chin strap which secures to a back portion of said helmet, said supplemental chin strap maintaining said helmet in proper orientation when said system is in said operational position.

11. The flip-up mount of claim 10, wherein said helmet is provided with a chin strap, said supplemental chin strap replaces said chin strap provided with said helmet.

12. The flip-up mount of claim 11, wherein said supplemental chin strap further comprises a first chin strap which secures to said back portion of said helmet, and a second chin strap which secures on both sides of said helmet, said first chin strap and said second chin strap combining together at an intersecting point at either side of an operator's chin.

13. A flip-up mount for supporting a night vision device, said flip-up mount comprising:

a support brace portion, said support brace portion including means for securing to a face mask worn on an operator's head for movement therewith, said support brace portion further including a pair of laterally spaced apart arms;

a shaft member extending between said pair of arms of said support brace portion, said shaft member defining a pivot axis for said flip-up mount so that a night vision device supported thereby may be selectively moved by the operator between an operative position in which said night vision device is disposed in front of an eye of the operator to provide night vision, and a non-operative position in which the night vision device is flipped up to provide the operator with unobstructed natural vision with the same eye;

a pivot sleeve member defining a bore therein which is received on said shaft member for both pivotal and axial relative movements;

a wall member, means securing said wall member to said pivot sleeve member so that said wall member extends from said pivot sleeve member, said wall member defining a pair of spaced apart carriage frame portions spaced from said pivot sleeve member;

a pair of carriage rail members respectively carried by said pair of carriage frame portions in spaced apart parallel relation;

a carriage member slidably carried on said pair of carriage rail members for selective movement toward and away from an eye of said operator, said carriage member including selective engagement and disengagement means for supportingly engaging with and disengaging from the night vision device to support the latter from said flip-up mount when so engaged;

said pivot sleeve member and said support brace portion defining cooperating means for selectively retaining said flip-up mount in each of said operative and said non-operative positions while said sleeve member is in a first axial position relative to said shaft member, and for allowing selective pivotal movement between said operative position and said non-operative position in response to axial relative movement of said sleeve member to a second axial position relative to said shaft member; and resilient means for yieldably urging said sleeve member to said first axial position relative to said shaft member.

14. The flip-up mount of claim 13 wherein said cooperating means for selectively retaining said flip-up mount in each of said operative and said non-operative positions includes one of said pair of laterally spaced apart arms of said support brace portion being non-rotationally associated with a facing washer, said facing washer defining an axially extending finger portion, said sleeve member similarly being relatively non-rotationally associated with a notched washer, said notched washer defining a pair of angularly disposed notches, said finger member being received in a respective one of said pair of notches to define each one of said operative and said non-operative positions for said flip-up mount, and said sleeve member moving axially relative to said shaft member in opposition to said yieldable resilient means to allow said finger to disengage from said pair of notches and permit pivotal movement of said flip-up mount between said positions.

15. The flip-up mount of claim 14 wherein said yieldable resilient means includes a coil compression spring received within said sleeve member.

16. The flip-up mount of claim 15 wherein said shaft member includes a pair of opposed portions each extending toward the other from a respective one of said pair of laterally spaced apart arms of said support brace member, one of said pair of opposed portions of said shaft defining an end surface upon which said coil compression spring bears, said coil compression spring bearing also on said notched washer to urge the latter yieldably into engagement with said facing washer.

17. The flip-up mount of claim 13 wherein said wall member further includes a pair of support webs each angularly extending between a respective one of said carriage frame members and said wall member.

18. The flip-up mount of claim 13 wherein said carriage member defines a plate-receiving portion which is configured to receive a dove-tail plate member attached to said night vision device.

* * * * *